(12) United States Patent
Brelot et al.

(10) Patent No.: US 9,201,656 B2
(45) Date of Patent: *Dec. 1, 2015

(54) DATA PROCESSING APPARATUS AND METHOD FOR PERFORMING REGISTER RENAMING FOR CERTAIN DATA PROCESSING OPERATIONS WITHOUT ADDITIONAL REGISTERS

(75) Inventors: Jean-Baptiste Brelot, Cambridge (GB); Cédric Denis Robert Airaud, Saint Laurent du Var (FR)

(73) Assignee: ARM Limited, Cambridge (GB)

( * ) Notice: Subject to any disclaimer, the term of this patent is extended or adjusted under 35 U.S.C. 154(b) by 394 days.

This patent is subject to a terminal disclaimer.

(21) Appl. No.: 13/309,719

(22) Filed: Dec. 2, 2011

(65) Prior Publication Data
US 2013/0145130 A1    Jun. 6, 2013

(51) Int. Cl.
*G06F 9/30* (2006.01)
*G06F 9/38* (2006.01)

(52) U.S. Cl.
CPC ....................................... *G06F 9/384* (2013.01)

(58) Field of Classification Search
CPC .......................................................... G06F 9/384
USPC ................................................................ 712/217
See application file for complete search history.

(56) References Cited

U.S. PATENT DOCUMENTS

| | | | |
|---|---|---|---|
| 5,664,215 A | 9/1997 | Burgess et al. | |
| 5,867,684 A * | 2/1999 | Kahle et al. | 712/218 |
| 6,035,391 A | 3/2000 | Isaman | |
| 6,560,671 B1 | 5/2003 | Samra et al. | |
| 2005/0010527 A1* | 1/2005 | Rarick et al. | 705/50 |
| 2006/0107268 A1* | 5/2006 | Chrabieh | 718/100 |

(Continued)

FOREIGN PATENT DOCUMENTS

| | | |
|---|---|---|
| EP | 0 495 162 | 7/1992 |
| WO | WO 02/054228 | 7/2002 |

OTHER PUBLICATIONS

Hennessy Patterson, Computer Architecuture A Quantitative Approach, 2003, Morgan Kaufmann, Third Edition, Back Cover 2 pages.*

(Continued)

*Primary Examiner* — Andrew Caldwell
*Assistant Examiner* — Jyoti Mehta
(74) *Attorney, Agent, or Firm* — Nixon & Vanderhye P.C.

(57) ABSTRACT

The data processing apparatus (and method) has processing circuitry for performing data processing operations in response to data processing instructions, the data processing instructions referencing logical registers. A set of physical registers are provided for storing data values for access by the processing circuitry when performing the data processing operations. Register renaming storage stores a one-to-one mapping between the logical registers and the physical registers, with the register renaming storage being accessed by the processing circuitry when performing the data processing operations in order to map the referenced logical registers to corresponding physical registers. Update circuitry is arranged to identify the physical registers corresponding to those multiple logical registers in the register renaming storage. Altered one-to-one mapping between multiple logical registers and identified physical registers is employed when performing the current data processing operation.

11 Claims, 8 Drawing Sheets

(56) References Cited

U.S. PATENT DOCUMENTS

2007/0192573 A1     8/2007    Savransky et al.
2012/0191956 A1     7/2012    Fleischman

OTHER PUBLICATIONS

Shen and Lipasti, Modern Processor Design, 2005, Mc Graw Hill, 1st edition, pp. 242-244.*

D. May et al, "Random Register Renaming to Foil DPA" Cryptographic Hardware and Embedded Systems, vol. 2162, May 2001, pp. 28-38.

Y. Lu et al, "Lightweight DPA Resistant Solution on FPGA to Counteract Power Models" International Conference on Field-Programmable Technology (FPT), Dec. 2010, pp. 178-183.

U.S. Appl. No. 13/309,739, filed Dec. 2, 2011, Craske.

Office Action mailed Apr. 14, 2014 in co-pending U.S. Appl. No. 13/309,739, 11 pages.

International Search Report and Written Opinion of the International Searching Authority mailed Jan. 23, 2013 in PCT/GB2012/052469, 10 pages.

International Search Report and Written Opinion of the International Searching Authority mailed Jan. 22, 2013 in PCT/GB2012/052455, 14 pages.

International Preliminary Report on Patentability dated Jun. 12, 2014 in PCT/GB2012/052469, 7 pages.

J. Irwin et al., "Instruction Stream Mutation for Non-Deterministic Processors", IEEE Computer Society, 2002, 10 pages.

* cited by examiner

| Physical Register | Allocation at t0 | Allocation at t1 | Allocation at t1bis | Allocation at t2 | Allocation at t3 | Allocation at t4 | Allocation at t5 | Allocation at t6 |
|---|---|---|---|---|---|---|---|---|
| | MOV r0, r0 | LDM r0!, {r3-r6} | Update the base | R3 value | R4 value | R5 value | R6 Value | LDR r0, [r1] |
| 0 | LR3 | Free | LR0 | LR0 | LR0 | LR0 | LR0 | LR0 |
| 1 | LR4 | Free | LR5 | LR5 | LR5 | LR5 | LR5 | LR5 |
| 2 | LR5 | Free | LR6 | LR6 | LR6 | LR6 | LR6 | LR6 |
| 3 | LR7 | LR7 | LR7 | LR7 | LR7 | LR7 | LR7 | LR7 |
| 4 | LR6 | Free | LR4 | LR4 | LR4 | LR4 | LR4 | LR4 |
| 5 | LR0 | Free | LR3 | LR3 | LR3 | LR3 | LR3 | LR3 |
| 6 | LR1 | LR1 | LR1 | LR1 | LR1 | LR1 | LR1 | LR1 |
| 7 | LR2 | LR2 | LR2 | LR2 | LR2 | LR2 | LR2 | LR2 |

FIG. 6

| Physical Register | Allocation at t0<br>MOV r0, r0 | Allocation at t1<br>LDM r0!, {r3-r6} | Allocation at t1bis<br>Update the base | Allocation at t2<br>R3 value | Allocation at t3<br>R4 value | Allocation at t4<br>R5 value | Allocation at t5<br>R6 Value | Allocation at t6<br>LDR r0, [r1] |
|---|---|---|---|---|---|---|---|---|
| | 360 | 365 | 370 | 375 | 380 | 385 | 390 | 395 |
| 0 | LR3 | Free | LR0 | LR0 | LR0 | LR0 | LR0 | LR0 |
| 1 | LR4 | Free | Free | Free | Free | LR5 | LR5 | LR5 |
| 2 | LR5 | Free | Free | Free | Free | Free | LR6 | LR6 |
| 3 | LR7 | LR7 | LR7 | LR7 | LR7 | LR7 | LR7 | LR7 |
| 4 | LR6 | Free | Free | Free | LR4 | LR4 | LR4 | LR4 |
| 5 | LR0 | Free | Free | LR3 | LR3 | LR3 | LR3 | LR3 |
| 6 | LR1 | LR1 | LR1 | LR1 | LR1 | LR1 | LR1 | LR1 |
| 7 | LR2 | LR2 | LR2 | LR2 | LR2 | LR2 | LR2 | LR2 |

FIG. 8

DATA PROCESSING APPARATUS AND METHOD FOR PERFORMING REGISTER RENAMING FOR CERTAIN DATA PROCESSING OPERATIONS WITHOUT ADDITIONAL REGISTERS

BACKGROUND OF THE INVENTION

1. Field of the Invention

The present invention relates to a data processing apparatus and method for performing register renaming without additional registers, which can be applied in a variety of situations, for example in relation to security sensitive applications.

2. Description of the Prior Art

It is known to provide a data processing apparatus which performs data processing operations in response to data processing instructions that reference logical registers (also known as program model registers), whilst the data processing apparatus itself stores the data values which are subjected to those data processing operations in a set of physical registers. Rather than maintaining a fixed mapping between the logical registers and the physical registers, it is known to carry out a technique known as register renaming in which the mapping between logical registers and physical registers is varied and updated.

The register renaming may be performed for predominately performance related reasons, such as to allow parallelism in the execution of data processing instructions, for example when data processing instructions in a sequence are executed either in parallel or at least out of order and register renaming techniques are then used to maintain different versions of a given logical register, such that those data processing instructions may be executed in this parallel or out-of-order fashion without data hazards occurring. Whilst register renaming is advantageous in terms of the performance benefits it can bring, the additional hardware which must be provided in a data processing apparatus to allow such register renaming to occur is a disadvantage due to the cost and complexity which it introduces. This drawback makes the opportunities to use register renaming techniques in relatively small, low-cost, low-power devices particularly limited.

Register renaming is also known as a valuable technique in the context of security sensitive devices because of the manner in which this technique makes it more difficult for an attacker to externally derive information about the internal operation of such a data processing apparatus, for example by fine-grained observation of the power consumption of the device or by invasive techniques which seek to introduce values into particular registers in order to observe the effect this has on the operation of the device. Whilst it would be desirable to allow the benefits of register renaming to be applied to such security sensitive devices, such devices are often constructed as small, low-cost, low-power devices and hence the additional architectural requirements associated with typical register renaming techniques have traditionally limited the opportunities for applying register renaming techniques in this context. For example, many known register renaming techniques require the number of physical registers to exceed the number of logical registers in order to enable those register renaming techniques to operate, and hence for any particular design of device, more physical registers would be required to support register renaming than would be required if register renaming was not used. In small devices, such as a small secure microprocessor, the size of the register file containing the physical registers is significant, and the resultant increase in the size of the register file required often precludes use of many register renaming techniques within such devices.

The paper "Instruction Stream Mutation for Non-Deterministic Processors", Irwin, Page and Smart, Proceedings of the IEEE International Conference on Application-Specific Systems, Architectures, and Processors (ASAP'02), 2002, describes various techniques that can be used to guard against differential power analysis (DPA) security attacks, one of the techniques involving a register renaming technique (referred to the article as register remapping) that uses a "liveness table" to control register renaming. In accordance with this technique, the number of physical registers does not need to exceed the number of logical registers, but extra instructions have to be added into the instruction flow to produce the information required to maintain the liveness table. Accordingly such an approach will require modification to the code executing on the device, and will have a significant impact on performance due to the need to execute those additional instructions.

It would be desirable to provide an improved technique for allowing the benefits of register renaming to be applied to data processing apparatuses, in particular in the context of small, low cost, low power devices, which alleviates the additional hardware requirement associated with many register renaming techniques, whilst avoiding the need to add additional instructions into the instruction flow.

SUMMARY OF THE INVENTION

Viewed from a first aspect, the present invention provides a data processing apparatus comprising: processing circuitry configured to perform data processing operations in response to data processing instructions, said data processing instructions referencing logical registers; a set of physical registers configured to store data values for access by the processing circuitry when performing said data processing operations; register renaming storage configured to store a one-to-one mapping between said logical registers and said physical registers, the register renaming storage being accessed by the processing circuitry when performing said data processing operations in order to map the referenced logical registers to corresponding physical registers; update circuitry, responsive to a current data processing operation performed by the processing circuitry requiring data to be written in respect of multiple of said logical registers, to identify the physical registers corresponding to said multiple of said logical registers in the register renaming storage, and to alter within the register renaming storage the one-to-one mapping between said multiple of said logical registers and those identified physical registers, such that the altered one-to-one mapping is employed when performing said current data processing operation; and if said current data processing operation does not require data to be written in respect of multiple of said logical registers, the one-to-one mapping within the register renaming storage not being altered prior to the processing circuitry referencing said register renaming storage during performance of said current data processing operation.

In accordance with the present invention, the inventors realised that register renaming could be provided in association with certain data processing operations without the need to increase the size of the physical register set relative to an equivalent apparatus that does not support register renaming, and without the need for adding any additional instructions to the instruction flow. In particular, in accordance with the present invention, register renaming is used when a current data processing operation performed by the processing circuitry requires data to be written in respect of multiple of the logical registers. In that instance, the register renaming storage is accessed in order to identify the physical registers that correspond to those multiple logical registers, and then the one-to-one mapping between those multiple logical registers and the identified physical registers is altered (i.e. register renaming is performed for those multiple logical registers using the group of physical registers that was previously allocated to those logical registers). The timing of this renaming is such that the altered one-to-one mapping resulting from the register renaming is employed when the data is actually written into the registers during the performance of that current data processing operation. For any data processing operations that do not require data to be written in respect of multiple logical registers, no renaming is performed and the current state of the register renaming storage is used to determine which physical registers are actually accessed during the performance of such data processing operations.

Whilst register renaming is not performed for all accesses to the physical registers, it has been found that the approach of the present invention can still provide significantly improved protection against security attacks, and in addition this can be achieved with minimal area and performance cost given that there is no need to increase the size of the physical register set when compared with an equivalent device not providing register renaming, and there is no need to modify the programs executing on the device to support register renaming. In the context of security related devices, data processing operations that require data to be written in respect of multiple logical registers occur relatively frequently, for example because security algorithms often tend to use load multiple instructions to load a series of data values into the registers prior to performing operations on that data, and the present invention enables register renaming to be performed whenever such operations take place.

In one embodiment, the processing circuitry is configured, if the current data processing operation requires data to be written in respect of multiple logical registers, to provide the update circuitry with a list identifying said multiple logical registers. The update circuitry then uses that list when accessing the register renaming storage in order to identify the physical registers corresponding to the logical registers in that list. In many implementations, the processing circuitry already produces such a list as one of its output signals when performing a data processing operation requiring multiple registers to be written to, and accordingly the provision of this list to the update circuitry can be readily accommodated.

The manner in which the update circuitry alters within the register renaming storage the one-to-one mapping between the multiple logical registers and the identified physical registers can take a variety of forms. For example, the update circuitry may cycle between transformations within a group of predetermined transformations, each transformation mapping the logical registers to the physical registers in a predetermined manner. However, in one embodiment, the data processing apparatus further comprises random number generator circuitry, responsive to the current data processing operation requiring data to be written in respect of multiple logical registers, to output a random number to the update circuitry. The update circuitry is then configured to use the random number to control how the one-to-one mapping within the register renaming storage is altered. The random number produced may in one embodiment be truly random, whilst in another embodiment a pseudo-random number can be generated. By using the random number output from the random number generator circuitry to control how the one-to-one mapping is altered, this further improves protection against security attacks as there will be no regular pattern in the manner in which the registers are renamed.

The timing of the alteration of the one-to-one mapping between the multiple logical registers and the identified physical registers can vary dependent on implementation. In one embodiment, the update circuitry is configured to alter the one-to-one mapping between the multiple logical registers and the identified physical registers before the processing circuitry references the register renaming storage to identify the physical register corresponding to any one of said multiple logical registers. Hence, in accordance with this embodiment, the register renaming is performed all in one go in respect of all of the multiple logical registers prior to any registers being written to by the current data processing operation. Such an approach can be generally applied irrespective of how the current data processing operation performs its multiple writes to the registers, and accordingly irrespective of whether the writes are performed sequentially, or at least partly in parallel, it can be ensured that the one-to-one mapping will have been altered in time for it to be applied when performing any of the multiple register writes.

However, in an alternative embodiment, if the current data processing operation requires data to be written sequentially to each logical register within the multiple logical registers, an alternative approach can be used to alter the one-to-one mapping. In particular, in accordance with this approach, the update circuitry creates a free list that initially identifies all of the identified physical registers corresponding to the multiple logical registers in the register renaming storage. As the current data processing operation requires each logical register to be written to, the update circuitry is configured to alter the one-to-one mapping for that logical register by allocating one of the physical registers identified in the free list, and then removing the allocated physical register from the free list. In accordance with this approach, the alteration of the one-to-one mapping is interleaved with each write, so that the one-to-one mapping for a particular logical register is altered prior to the write being performed to that particular logical register.

There are various forms of data processing operation that may require data to be written in respect of multiple logical registers. In one embodiment, the current data processing operation requiring data to be written in respect of multiple logical registers is performed in response to a load multiple instruction, the load multiple instruction identifying multiple logical registers, and causing data to be loaded from memory into corresponding multiple physical registers of the set of physical registers dependent on the altered one-to-one mapping stored in the register renaming storage. As mentioned previously, such load multiple instructions are often used frequently in security-related applications, and hence a good level of security attack resilience can be provided by performing register renaming in respect of such operations. In addition, further improved resilience could be realised, if desired, by increasing the use of such load multiple instructions within the software executing on the apparatus.

Alternatively, or in addition, the current data processing operation requiring data to be written in respect of multiple logical registers may be a mode switch operation causing a switch from a first mode of operation to a second mode of operation, during which data pertinent to the second mode of operation is loaded from a stack into physical registers of the set of physical registers that correspond to a predetermined multiple of said logical registers as identified by the altered one-to-one mapping stored in the register renaming storage. Mode switches occur frequently when executing security software. For example, it is often the case that during a normal operating mode, an exception will take place, which will cause the processing circuitry to transition to a secure mode of operation in which an exception handling routine is executed. During the transition to the secure mode of operation, the data held within at least some of the physical registers will be stored from those physical registers into a stack within memory. On completion of the exception handling routine, the processing circuitry will then transition back from the secure mode of operation to the normal mode of operation to resume processing from the point in the program code that was executing at the time the exception was taken. As part of this transition back to the normal mode of operation, an unstacking operation will take place whereby the data that had been held in the stack in memory is loaded back into the relevant physical registers. As this is an operation that will require multiple of the registers to be written to, the register renaming technique of embodiments of the present invention can be used during that unstacking operation.

In one embodiment, the set of physical registers may have multiple write ports allowing multiple physical registers to be written to simultaneously. In such a situation, further data processing operations can take place that require data to be written in respect of multiple logical registers. In particular, in such embodiments, such a data processing operation may be performed in response to execution of one or more instructions that cause a simultaneous write to, be performed via the multiple write ports in respect of two or more physical registers mapped to a corresponding two or more logical registers in the register renaming storage. For example, some of the more complicated arithmetic instructions can result in the output of two items of result data simultaneously to be written in two different registers via the multiple write ports. Alternatively, in some systems, multiple instructions may execute in parallel in different execution units, and accordingly may each produce outputs that are to be written simultaneously to the physical registers via the multiple write ports. Examples could be execution of two single load instructions in parallel, execution of an arithmetic instruction in parallel with a single load instruction, execution of two arithmetic instructions in parallel, etc.

Viewed from a second aspect, the present invention provides a method of performing register renaming within a data processing apparatus comprising processing circuitry for performing data processing operations in response to data processing instructions, said data processing instructions referencing logical registers, and a set of physical registers for storing data values for access by the processing circuitry when performing said data processing operations, the method comprising: (a) storing within register renaming storage a one-to-one mapping between said logical registers and said physical registers; (b) accessing the register renaming storage when performing said data processing operations in order to map the referenced logical registers to corresponding physical registers; (c) responsive to a current data processing operation performed by the processing circuitry requiring data to be written in respect of multiple of said logical registers, identifying the physical registers corresponding to said multiple of said logical registers in the register renaming storage, and altering within the register renaming storage the one-to-one mapping between said multiple of said logical registers and those identified physical registers, such that the altered one-to-one mapping is employed when accessing the register renaming storage at said step (b) during performance of said current data processing operation; and (d) if said current data processing operation does not require data to be written in respect of multiple of said logical registers, retaining the one-to-one mapping within the register renaming storage unaltered such that the unaltered one-to-one mapping is employed when accessing the register renaming storage at said step (b) during performance of said current data processing operation.

Viewed from a third aspect, the present invention provides a data processing apparatus comprising: processing means for performing data processing operations in response to data processing instructions, said data processing instructions referencing logical registers; a set of physical register means for storing data values for access by the processing means when performing said data processing operations; register renaming storage means for storing a one-to-one mapping between said logical registers and said physical register means, the register renaming storage means for access by the processing means when performing said data processing operations in order to map the referenced logical registers to corresponding physical register means; update means, responsive to a current data processing operation performed by the processing means requiring data to be written in respect of multiple of said logical registers, for identifying the physical register means corresponding to said multiple of said logical registers in the register renaming storage means, and for altering within the register renaming storage means the one-to-one mapping between said multiple of said logical registers and those identified physical register means, such that the altered one-to-one mapping is employed when performing said current data processing operation; and if said current data processing operation does not require data to be written in respect of multiple of said logical registers, the one-to-one mapping within the register renaming storage means not being altered prior to the processing means referencing said register renaming storage means during performance of said current data processing operation.

BRIEF DESCRIPTION OF THE DRAWINGS

The present invention will be described further, by way of example only, with reference to embodiments thereof as illustrated in the accompanying drawings, in which:

FIG. 6 is a table providing an example of how register renaming is performed when performing the process of FIG. 5;

FIG. 8 is a table providing an example of how register renaming is performed when performing the process of FIG. 7.

DESCRIPTION OF EMBODIMENTS

Figure 1:
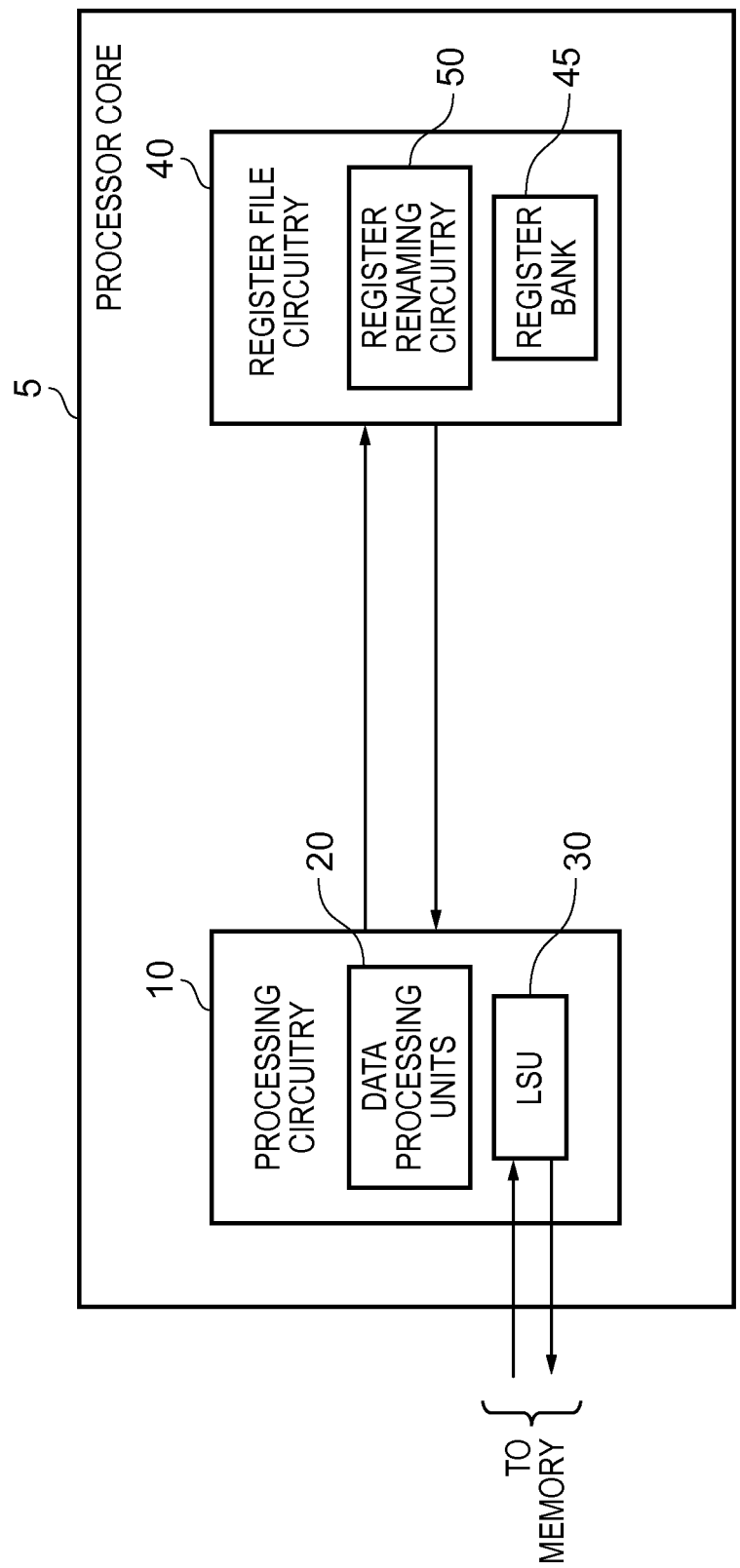
FIG. 1 is a block diagram of a data processing apparatus in accordance with one embodiment.

FIG. 1 is a block diagram of a data processing apparatus in accordance with one embodiment. In this example, the data processing apparatus takes the form of a processor core 5 which includes processing circuitry 10 for performing data processing operations in response to data processing instructions. Register file circuitry 40 is also provided that contains a register bank 45 (also referred to herein as a register file) that provides a set of physical registers for storing data values for access by the processing circuitry when performing the data processing operations.

The processing circuitry 10 can provide a number of data processing units for performing the required data processing operations. One of those data processing units will typically be a load/store unit (LSU) 30 used to load data from memory into registers of the register bank 45, or to store data from registers of the register bank 45 back to memory. The other data processing units (collectively identified by the block 20 in FIG. 1) can take a variety of forms, for example an arithmetic logic unit (ALU) for performing arithmetic operations, a floating point (FPU) unit for performing floating point operations, a prefetch unit for prefetching instructions, etc. These other data processing units 20 will also read data from the register bank 45 and write data to the register bank 45 during performance of their data processing operations.

In accordance with the described embodiment, the data processing instructions executed on the processing circuitry 10 reference logical registers, and the mapping of those logical registers to physical registers within the register bank 45 can be varied in certain situations by the register renaming circuitry 50. In particular, as will be discussed in more detail later, if the current data processing operation being performed by the processing circuitry 10 requires data to be written in respect of multiple logical registers, then a register renaming operation is performed by the register renaming circuitry 50 to alter the mapping between the logical registers and the physical registers prior to data being written into the physical registers during the performance of that data processing operation. However, for any data processing operations that do not require data to be written in respect of multiple logical registers, no such renaming is performed, and the current state of a renaming table maintained by the register renaming circuitry 50 is used to identify the mapping between the logical registers and the physical registers.

Figure 2:
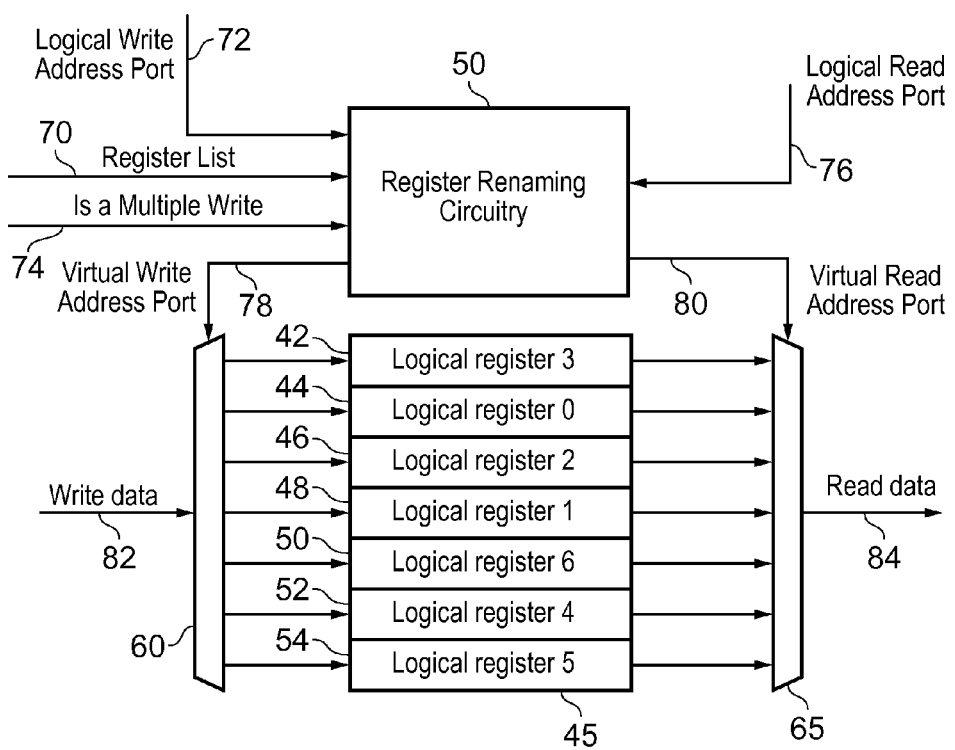
FIG. 2 illustrates in more detail one example of the register file circuitry of FIG. 1 in accordance with one embodiment.
Figure 3:
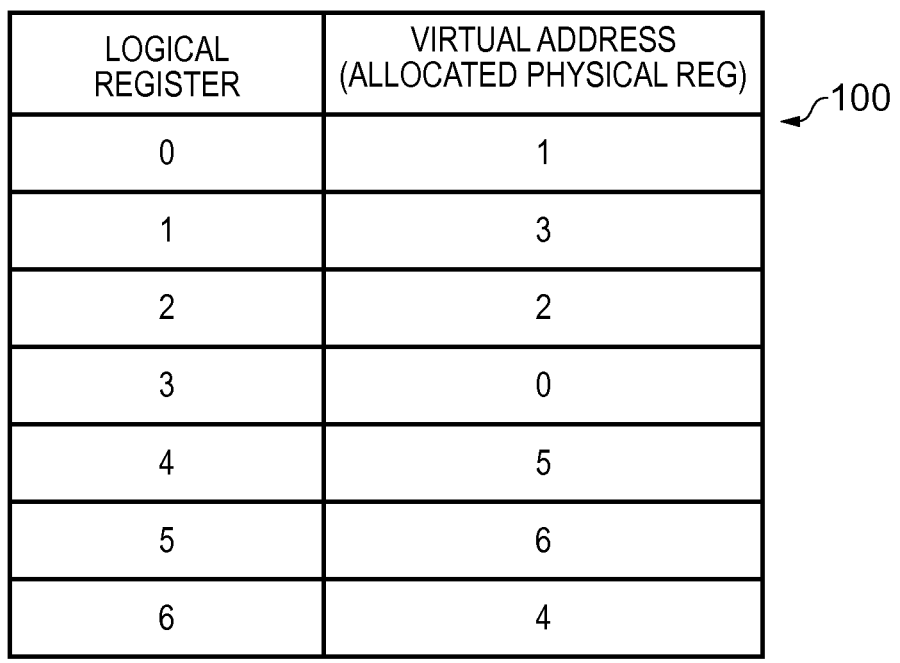
FIG. 3 illustrates data that may be held within a renaming table within the register renaming circuitry of FIG. 2 for the particular mapping of logical to physical registers shown in FIG. 2.

FIG. 2 illustrates the register file circuitry 40 of FIG. 1 in more detail. In this example, it is assumed that the register bank has a single write port, and a single read port, so that at any point in time data can be written into only one register, and data can be read from only one register. When a write is to be performed to a register of the register bank 45, an indication of the logical register (also referred to herein as a logical write address) is provided to a logical write address port of the register file circuitry 40 from the processing circuitry 10, and is routed from that port over path 72 to the register renaming circuitry 50. Similarly, if a read is to take place from one of the registers of the register bank 45, a logical read address is provided from the processing circuitry 10 to a logical read address port of the register file circuitry 40, from where it is routed over path 76 to the register renaming circuitry 50. The register renaming circuitry maintains a renaming table providing a one-to-one mapping between the logical registers that can be specified in instructions and the actual physical registers 42, 44, 46, 48, 50, 52, 54 of the register bank 45. FIG. 3 schematically illustrates such a renaming table 100 for the specific example illustrated in FIG. 2. In this example, logical register 0 is mapped to the physical register 1 44, logical register 1 is mapped to the physical register 3 48, etc.

For any read performed in respect of the registers of the register bank 45, the register renaming circuitry 50 accesses the renaming table using the logical read address, in order to identify the physical register that is currently mapped to that logical register, and outputs an indication of that physical register (also referred to herein as a virtual read address) over path 80 to a virtual read address port, this information being used to control the multiplexer 65 in order to cause the output from the appropriate physical register to be routed out over path 84 as the read data, this read data then being returned to the processing circuitry 10.

For a write operation that does not require data to be written in respect of multiple logical registers, an analogous process is performed using the logical write address provided over path 72, with the virtual write address as identified from accessing the renaming table then being output over path 78 to control the multiplexer 60, in order to cause the write data provided over path 82 from the processing circuitry 10 to be routed to the appropriate physical register within the register bank 45.

However, if the current data processing operation being performed by the processing circuitry 10 requires data to be written in respect of multiple logical registers, the register renaming circuitry 50 is arranged to detect such a condition, and on such detection is arranged to invoke update circuitry within the register renaming circuitry 50 to perform register renaming in respect of the relevant logical registers prior to the physical registers being written to. In many situations where such a data processing operation is being performed, the processing circuitry 10 will output a signal over path 74 indicating that the operation is a multiple write operation, and in that instance will also provide a register list over path 70 identifying the list of logical registers to be written to. An example situation where such signals will be issued by the processing circuitry 10 is where the LSU 30 is executing a load multiple (LDM) instruction in order to load data from memory into multiple registers of the register bank.

As another example, when the processing circuitry transitions to a secure mode of operation to execute an exception handling routine to handle an exception that has been raised, current state from the register bank 45 will typically be stored to a stack in memory during the transition from the normal mode of operation to that secure mode of operation. When the exception handling routine has been completed, the processing circuitry 10 will then transition back to the normal mode of operation, during which an unstacking operation will be performed to load back into the register bank 45 the data that had been placed on the stack. The register list for such an operation is predetermined, since the unstacking operation will be performed in respect of a predetermined number of the registers. A signal will be issued from the processing circuitry 10 to the register file circuitry 40 indicating that such an unstacking operation is being performed, this signal being interpreted as indicating the presence of a multiple write operation.

In other embodiments, multiple write ports may be provided in association with the register bank such that more than one write operation may be performed in parallel in respect of the register bank 45. In such situations, the number of operations performed by the processing circuitry that may require data to be written in respect of multiple logical registers is increased, since individual instructions executed within data processing units of the processing circuitry 10 may themselves generate more than one result data value to be written in parallel to different logical registers, or an instruction executed in one processing unit that produces one output may be performed in parallel with execution of another instruction in another processing unit that also produces one output, with both of those outputs being written to the register file simultaneously. In such embodiments, there will be more than one logical write address port, and the register list can be constructed from the various logical write addresses provided at those ports. Further, the presence of the multiple write condition can be detected by the presence of more than one valid logical write address presented during the same clock cycle.

Whenever the multiple write condition is detected, the update circuitry uses the register list to access the renaming table in order to identify the physical registers corresponding to the multiple logical registers in that register list. It then reallocates those identified physical registers amongst the multiple logical registers in order to alter within the register renaming storage the one-to-one mapping between those multiple logical registers and those identified physical registers. The timing of this alteration of the mapping is performed so that as each write takes place during performance of the current data processing operation, the altered one-to-one mapping is employed when identifying the actual physical register to be written to.

Figure 4:
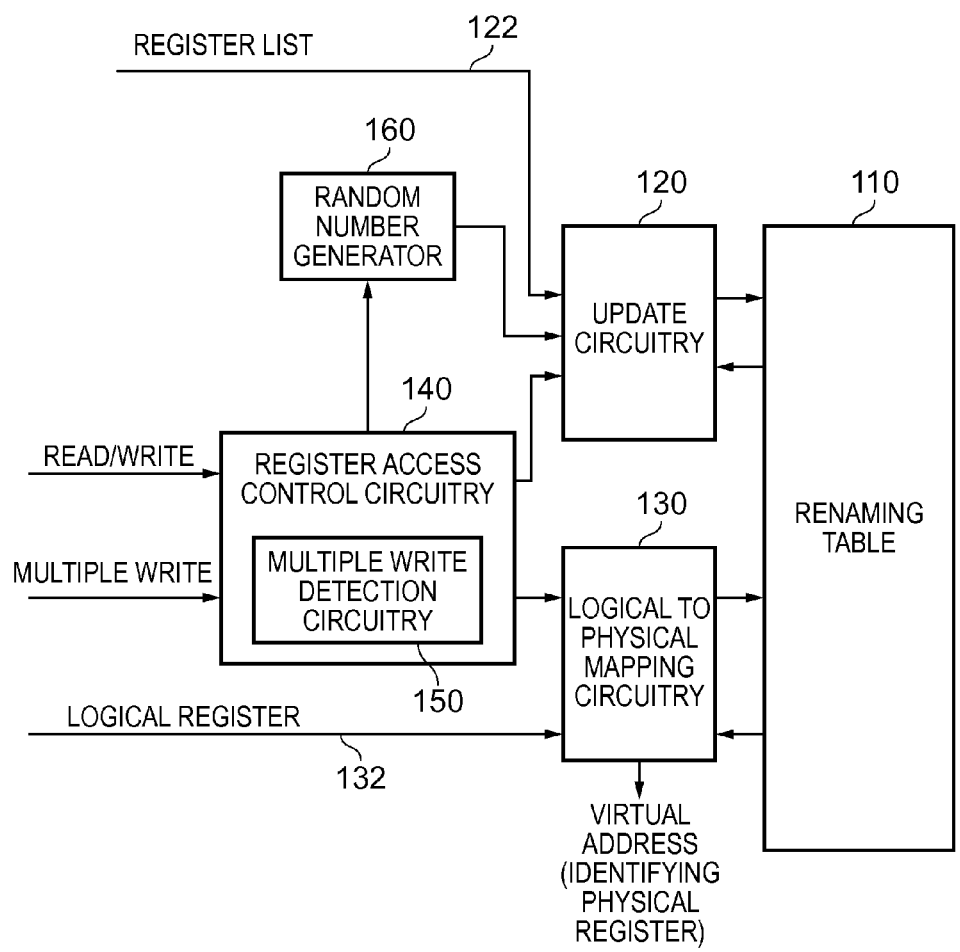
FIG. 4 is a block diagram illustrating in more detail components provided within the register renaming circuitry of FIG. 2 in accordance with one embodiment.

FIG. 4 is a block diagram illustrating in more detail components provided within the register renaming circuitry 50 of FIG. 2 in accordance with one embodiment. A renaming table 110 is provided for identifying, for each logical register, the associated physical register. There are a number of formats in which data can be held within the renaming table in order to achieve this mapping. For example, index values can be stored to identify how the logical address identifying a logical register can be converted into a virtual address identifying a physical register.

The renaming table 110 is accessed via the logical to physical mapping circuitry 130 which, based on a provided logical register indication (also referred to herein as the logical register address) provided over path 132, can perform a lookup in the renaming table in order to identify the corresponding physical register and can then output to the relevant multiplexer 60, 65 of the register bank 45 a virtual address identifying the physical register to be accessed.

Register access control circuitry 140 is provided for controlling the operation of the logical to physical mapping circuitry 130 and, for selected operations, for controlling the operation of the update circuitry 120. In particular, for each access to the register bank, the register access control circuitry receives a read/write signal identifying where the access is a read access or a write access, and also receives a multiple write signal in the event that the access required involves the writing of data in respect of multiple logical registers. This signal is routed to multiple write detection circuitry 150 within the register access control circuitry 140. In the absence of a multiple write operation, the register access control circuitry 140 sends an enable signal to the logical to physical mapping circuitry 130 to cause it to access the renaming table 110 based on the logical register identifier provided over path 132. However, in the event of a multiple write operation, the register access control circuitry 140 first sends an enable signal to the update circuitry 120 to cause it to perform a renaming operation in respect of certain logical registers within the renaming table 110. In particular, the update circuitry 120 receives the register list over path 122 and based on that information accesses the renaming table 110 in order to identify the physical registers that currently correspond with those multiple logical registers identified in the register list. It then alters how that identified group of physical registers are associated with the multiple logical registers within the register list, such that by the time the register access control circuitry 140 enables the logical to physical mapping circuitry 130 to perform its operation based on a provided logical register identifier over path 132, the altered mapping is used.

There are a number of ways in which the update circuitry 120 can alter the mapping. For example, it could be provided with a predefined set of transformations for performing such remapping, and cycle through those transformations so as to use a different transformation from the set each time such an update operation is performed. However, in one embodiment a random number generator 160 is provided which is controlled by the register access control circuitry 140 to generate a random number in the presence of a multiple write operation, with that random number being provided as an input to the update circuitry 120. Whilst the random number generated may be a true random number, in one embodiment, the random number generator 160 is a pseudo-random number generator which generates a pseudo-random number. The update circuitry 120 can then use the random number to control how each logical register in the list is mapped to one of the identified physical registers. Such an approach ensures that there is no repetitive pattern as to how the updates are performed, hence further improving security.

Figure 5:
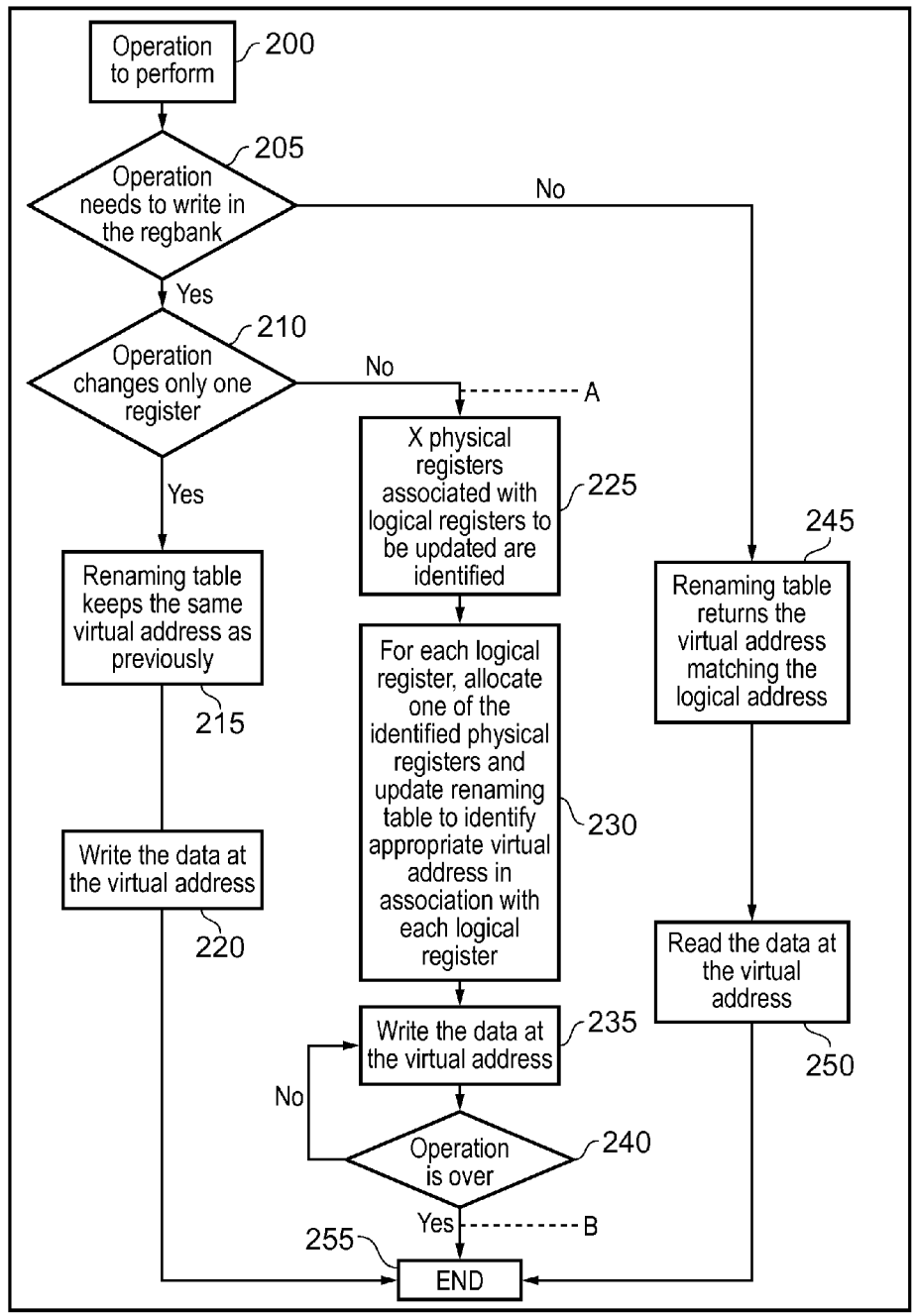
FIG. 5 is a flow diagram illustrating how the physical registers are accessed during performance of an operation in accordance with one embodiment.

FIG. 5 is a flow diagram illustrating the operation of the circuitry of FIG. 3-4 in accordance with one embodiment. At step 200 it is determined that there is an operation to be performed that requires an access to the register bank. At step 205, it is determined whether the operation needs to write into the register bank, and if not the register access control circuitry 140 causes the logical to physical mapping circuitry 130 to access the renaming table 110 at step 245 using the logical register address provided over path 132. This causes the renaming table to return at step 245 the virtual address matching the logical address, whereafter the data is then read from that virtual address at step 250. The read data is then returned to the processing circuitry. The process then ends at step 255.

If it is determined at step 205 that the operation does need to write into the register bank, it is then determined at step 210 whether the operation changes the contents of only one register. If it does, then the register access control circuitry 140 causes the logical to physical mapping circuitry 130 to perform a lookup in the renaming table 110 based on the logical register address provided over path 132 at step 215. During this process, the renaming table is unchanged, and hence the logical register keeps the same virtual address as previously. Thereafter, at step 220, the write data provided by the processing circuitry is written into the physical register identified by the virtual address, whereafter the process ends at step 255.

If at step 210 it is determined that the operation does not only change one register, i.e. is an operation requiring data to be written in respect of multiple logical registers, then the process branches to step 225 where the X physical registers associated with the logical registers to be updated are identified. This step is performed by the update circuitry 120 using the register list provided over path 122, with the update circuitry accessing the renaming table 110 in order to identify those physical registers.

At step 230, the update circuitry 120 then performs a re-allocation of the physical registers for each logical register in the register list. In particular, for each logical register in the register list, the update circuitry 120 allocates one of the identified physical registers and updates the renaming table accordingly in order to identify the appropriate virtual address in association with that logical register.

Once this has been performed for each of the logical registers, the write operation can continue. In particular, at step 235, the register access control circuitry 140 causes the logical to physical mapping circuitry 130 to access the renaming table based on the provided logical register identifier on path 132 in order to obtain the appropriate virtual address (this now being based on the altered remapping resulting from the operations of the update circuitry) and then the data is written to the register at that virtual address. It is then determined at step 240 whether the operation has completed (i.e. all data has been written), and if not step 235 is re-performed for the next logical register identifier provided over path 132. Once the operation is over, the process then ends at step 255.

FIG. 6 is a table schematically illustrating how the renaming table 110 is modified in accordance with the technique of FIG. 5 when performing a sample sequence of instructions, namely a move instruction affecting a single register, followed by a load multiple (LDM) instruction affecting multiple registers, followed thereafter by a single load instruction affecting only one register. When the move instruction is performed at time t0, it is assumed that the mapping between logical and physical registers is as indicated by the column 260 in FIG. 6. Since this move instruction only updates the contents of a single register, no alteration is made to the renaming table, and accordingly physical register 5 is accessed when performed the move operation in respect of logical register r0.

When the load multiple instruction is executed at time t1, this causes the update circuitry 120 to identify all of the registers that will be written to when performing that load multiple operation. This includes not only the destination registers r3 to r6, but also the source register r0 containing the source address, since that will be updated during performance of the load multiple operation to identify the new base address. Hence, as shown by column 265, those physical registers associated with the destination logical registers r3 to r6 and with the source logical register r0 are hence identified (treated as being free for remapping), the relevant physical registers being physical registers 0, 1, 2, 4 and 5. At time t1*bis* (i.e. later during the same clock cycle), the base address is updated in the logical register r0. Prior to committing that update to a physical register, the update circuitry performs a remapping for logical register r0, and in one embodiment the physical register is actually chosen in a random way using the random number input from the random generator 160. In this example, it is assumed that the random number input causes the update circuitry to associate the logical register 0 with the physical register 0, and accordingly the updated base address is stored in the physical register 0, as indicated by the column 270.

In accordance with the process of FIG. 5, all of the other logical registers are remapped at the same time, and again this can be done randomly based on the provided random number. In this example, as shown in column 270, it is assumed that the logical register 5 is remapped to the physical register 1, the logical 6 is remapped to the physical register 2, the logical register 4 is remapped to the physical register 4 and the logical register 3 is remapped to the physical register 5.

At times t2, t3, t4 and t5, the four write operations are then performed in respect of the logical registers r3, r4, r5 and r6, respectively, and for these write operations the modified remapping determined at time t1*bis* is used. The columns 275, 280, 285, 290 illustrate that this modified remapping is used, and hence for example the logical register 3 data value is written into the physical register 5 at time t2, the logical register 4 data value is written into the physical register 4 at time t3, etc.

Following performance of the load multiple instruction, a single load instruction is performed at time t6 in column 295 of FIG. 5. Since this does not involve the update of more than one logical register, then no alteration is made to the contents of the renaming table, and hence when the register r0 is updated to store data associated with an address provided by the logical register r1, that data is written into the physical register 0 in accordance with the current contents of the renaming table.

Figure 7:
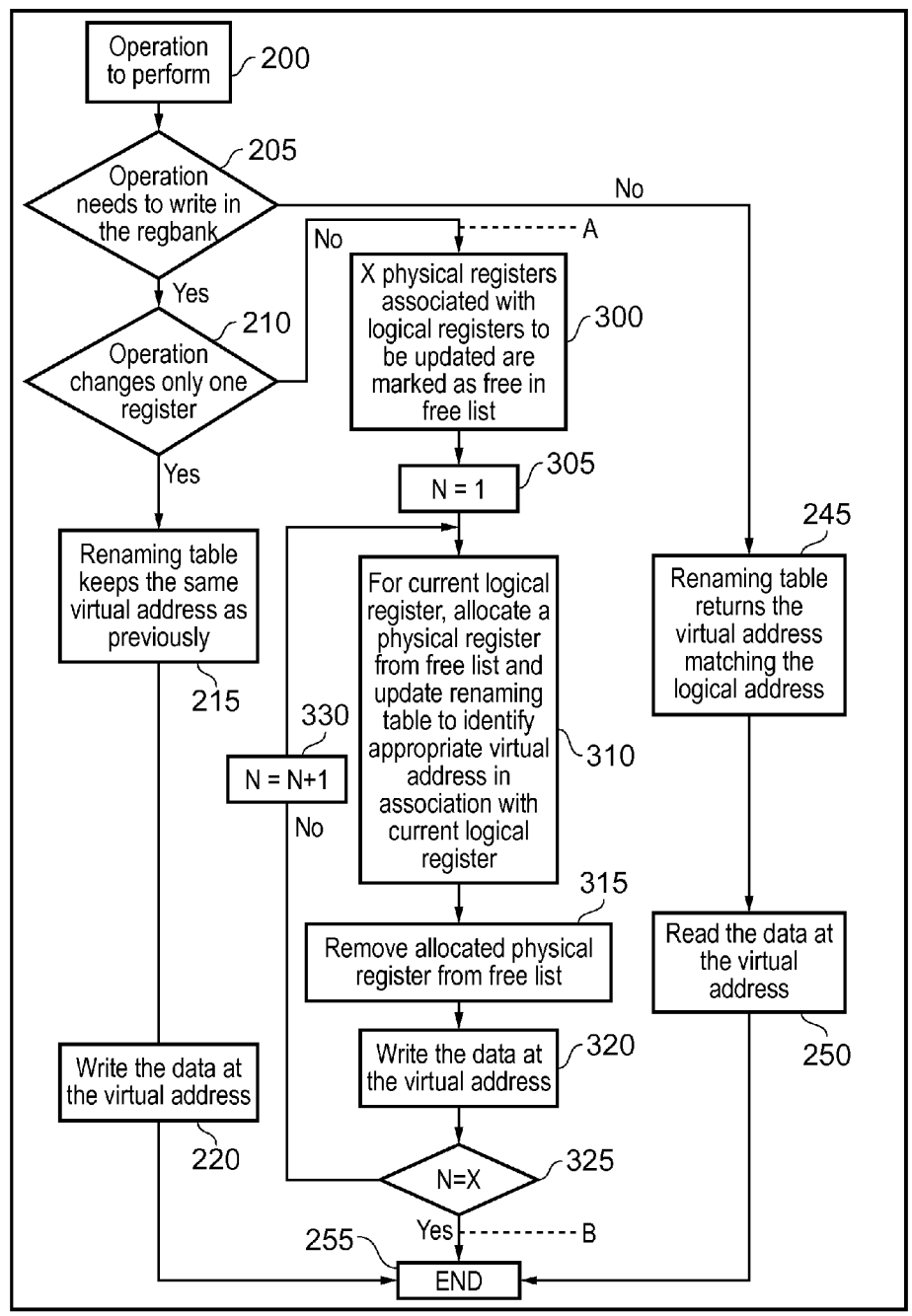
FIG. 7 is a flow diagram illustrating how the physical registers are accessed during performance of an operation in accordance with an alternative embodiment.

FIG. 7 is a flow diagram illustrating how the circuitry of FIG. 4 may operate in accordance with an alternative embodiment. As will be apparent from a comparison of FIGS. 5 and 7, the only difference occurs between the points A and B, and hence the other parts of the figure will not be discussed further since the steps performed are as discussed earlier with reference to FIG. 5. However, in accordance with FIG. 7, the sequence of steps performed for an operation requiring data to be written in respect of multiple logical registers differs slightly, in this embodiment it being assumed that the multiple writes are performed sequentially. At step 300, the X physical registers associated with the logical registers in the register list are identified and are marked as free within a free list. The free list can be provided in a variety of ways, and in one embodiment may take the form of a small storage block accessible to the update circuitry 120. At step 305, a variable N is set equal to 1. Then, at step 310, for the current logical register, a physical register from the free list is allocated to that logical register, and the renaming table is updated accordingly to identify the appropriate virtual address in association with the current logical register.

Thereafter, at step 315, the allocated physical register is removed from the free list, whereafter at step 320 the write operation required for the logical register considered at step 310 is performed. Hence, at this stage, the logical register address provided over path 132 is used by the logical to physical mapping circuitry 130 to perform a lookup in the renaming table 110 in order to identify the virtual address that identifies the required physical address to be written to. At this point, the altered remapping that occurred as a result of step 310 will be utilised.

At step 325, it is then determined whether the variable N is equal to X, i.e. whether remapping has been performed for all of the logical registers, and if not the variable N is incremented at step 330, and the process returns to step 310. This process continues until, at step 325, it is determined that all of the logical registers have been remapped, and all of the required write operations have been performed, whereafter the process ends at step 255.

FIG. 8 is a table illustrating how the renaming table is modified when performing the process of FIG. 7, FIG. 8 assuming that exactly the same sequence of instructions is executed as discussed earlier with reference to FIG. 6. It will be seen that columns 360 and 365 are identical to columns 260 and 265 of FIG. 6. However, when at time t1*bis* the base address is updated, only the remapping for the logical register 0 is updated at that time, and again it is assumed that based on the random number output from the random number generator, it is decided to associate the logical register 0 with the physical register 0. At this time, the physical register 0 is removed from the free list, but the physical registers 1, 2, 4 and 5 remain in the free list. When at time t2, it is required to write the logical register 3 data value, a further modification is made to the renaming table to remap the logical register 3 to one of the available physical registers in the free list. Again this can be done randomly, and it is assumed for consistency with FIG. 6 that the logical register 3 is allocated to the physical register 5. At this point, the physical register 5 is removed from the free list, and the physical registers 1, 2 and 4 remain in the free list. Accordingly, the renaming table now has the form illustrating schematically by the column 375.

As shown by the columns 380, 385 and 390, the renaming table is modified for each of the further write operations of the load multiple operation, and for consistency with FIG. 6 it is assumed that the same remapping is performed as was discussed earlier with reference to FIG. 6. Hence, by the time the final write operation takes place at time t5, the renaming table takes the form indicated by column 390, this being identical to the form illustrated in column 290 of FIG. 6. In exactly the same way as discussed earlier with reference to FIG. 6, when the subsequent single load instruction is performed, no modification is made to the renaming table, as indicated schematically by column 395.

From the above description of embodiments, it will be seen that such embodiments allow register renaming to be performed for certain operations, whilst avoiding the need to increase the size of the physical register set, and avoiding the need to make any alterations to the programs executing on the processor core in order to support register renaming. This hence enables some degree of register renaming to be performed, thereby providing enhanced robustness to security attacks, with minimal overhead when compared with an equivalent processor core having no register renaming functionality. In accordance with the described techniques, register renaming is performed wherever a current data processing operation performed by the processing circuitry requires data to be written in respect of multiple logical registers. Such operations typically occur frequently when executing security applications, and hence performing register renaming for such operations is highly beneficial. For any operations which do not require data to be written in respect of multiple logical registers, no register renaming is performed, and the current contents of the renaming table are used to provide the mapping between logical and physical registers. Such an approach can provide power consumption benefits by reducing dynamic power consumption when compared with approaches that perform register renaming for every operation.

Although particular embodiments of the invention have been described herein, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. A data processing apparatus comprising:
processing circuitry configured to perform data processing operations in response to data processing instructions, said data processing instructions referencing logical registers;
a set of physical registers configured to store data values for access by the processing circuitry when performing said data processing operations;
register renaming storage configured to store a one-to-one mapping between said logical registers and said set of physical registers, the register renaming storage being accessed by the processing circuitry when performing said data processing operations in order to map the referenced logical registers to corresponding physical registers in said set of physical registers;
update circuitry, responsive to a current data processing operation performed by the processing circuitry requiring data to be written in respect of multiple of said logical registers, to identify physical registers corresponding to said multiple of said logical registers in the register renaming storage, and to alter within the register renaming storage the one-to-one mapping between said multiple of said logical registers and those identified physical registers, such that the altered one-to-one mapping is employed when performing said current data processing operation; and
in all instances, when said current data processing operation requires data to be written in respect of only one of said logical registers, the one-to-one mapping within the register renaming storage is retained unaltered such that the unaltered one-to-one mapping is employed when mapping each referenced logical register to the corresponding physical register during performance of said current data processing operation.

2. A data processing apparatus as claimed in claim 1, wherein:
said processing circuitry is configured, when said current data processing operation requires data to be written in respect of multiple of said logical registers, to provide said update circuitry with a list identifying said multiple of said logical registers.

3. A data processing apparatus as claimed in claim 1, further comprising:
random number generator circuitry, responsive to said current data processing operation requiring data to be written in respect of multiple of said logical registers, to output a random number to the update circuitry;
the update circuitry being configured to use the random number to control how the one-to-one mapping within the register renaming storage is altered.

4. A data processing apparatus as claimed in claim 3, wherein the random number output by said random number generator circuitry is a pseudo random number.

5. A data processing apparatus as claimed in claim 1, wherein:
the update circuitry is configured to alter the one-to-one mapping between said multiple of said logical registers and the identified physical registers before the processing circuitry references the register renaming storage to identify a physical register corresponding to any one of said multiple logical registers.

6. A data processing apparatus as claimed in claim 1, wherein:
the current data processing operation performed by the processing circuitry requires data to be written sequentially to each logical register within said multiple of said logical registers;
the update circuitry creates a free list that initially identifies all of the identified physical registers corresponding to said multiple of said logical registers in the register renaming storage;
as the current data processing operation requires each logical register to be written to, the update circuitry is configured to alter the one-to-one mapping for that logical register by allocating one of the physical registers identified in said free list, and then removing the allocated physical register from the free list.

7. A data processing apparatus as claimed in claim 1, wherein said current data processing operation requiring data to be written in respect of multiple of said logical registers is performed in response to a load multiple instruction, the load multiple instruction identifying multiple logical registers, and causing data to be loaded from memory into corresponding multiple physical registers of the set of physical registers dependent on the altered one-to-one mapping stored in the register renaming storage.

8. A data processing apparatus as claimed in claim 1, wherein said current data processing operation requiring data to be written in respect of multiple of said logical registers is a mode switch operation causing a switch from a first mode of operation to a second mode of operation, during which data pertinent to the second mode of operation is loaded from a stack into physical registers of the set of physical registers that correspond to a predetermined multiple of said logical registers as identified by the altered one-to-one mapping stored in the register renaming storage.

9. A data processing apparatus as claimed in claim 1, wherein:
   said set of physical registers has multiple write ports allowing multiple physical registers to be written to simultaneously; and
   said current data processing operation requiring data to be written in respect of multiple of said logical registers is performed in response to execution of one or more instructions that cause a simultaneous write to be performed via the multiple write ports in respect of two or more physical registers mapped to a corresponding two or more logical registers in the register renaming storage.

10. A method of performing register renaming within a data processing apparatus comprising processing circuitry for performing data processing operations in response to data processing instructions, said data processing instructions referencing logical registers, and a set of physical registers for storing data values for access by the processing circuitry when performing said data processing operations, the method comprising:
   (a) storing within register renaming storage a one-to-one mapping between said logical registers and said set of physical registers;
   (b) accessing the register renaming storage when performing said data processing operations in order to map the referenced logical registers to corresponding physical registers in said set of physical registers;
   (c) responsive to a current data processing operation performed by the processing circuitry requiring data to be written in respect of multiple of said logical registers, identifying the physical registers corresponding to said multiple of said logical registers in the register renaming storage, and altering within the register renaming storage the one-to-one mapping between said multiple of said logical registers and those identified physical registers, such that the altered one-to-one mapping is employed when accessing the register renaming storage at said step (b) during performance of said current data processing operation; and
   (d) in all instances, when said current data processing operation requires data to be written in respect of only one of said logical registers, retaining the one-to-one mapping within the register renaming storage unaltered such that the unaltered one-to-one mapping is employed when accessing the register renaming storage at said step (b) during performance of said current data processing operation.

11. A data processing apparatus comprising:
   processing means for performing data processing operations in response to data processing instructions, said data processing instructions referencing logical registers;
   a set of physical register means for storing data values for access by the processing means when performing said data processing operations;
   register renaming storage means for storing a one-to-one mapping between said logical registers and said set of physical register means, the register renaming storage means for access by the processing means when performing said data processing operations in order to map the referenced logical registers to corresponding physical register means in said set of physical register means;
   update means, responsive to a current data processing operation performed by the processing means requiring data to be written in respect of multiple of said logical registers, for identifying physical register means corresponding to said multiple of said logical registers in the register renaming storage means, and for altering within the register renaming storage means the one-to-one mapping between said multiple of said logical registers and those identified physical register means, such that the altered one-to-one mapping is employed when performing said current data processing operation; and
   in all instances, when said current data processing operation requires data to be written in respect of only one of said logical registers, the one-to-one mapping within the register renaming storage means is retained unaltered such that the unaltered one-to-one mapping is employed when mapping each referenced logical register to the corresponding physical register means during performance of said current data processing operation.

* * * * *